United States Patent
Marais et al.

(10) Patent No.: US 12,048,863 B2
(45) Date of Patent: Jul. 30, 2024

(54) SKILL LEVEL DETERMINATION AND MANAGEMENT SYSTEM AND METHOD

(71) Applicant: ALPHAWAVE GOLF (PTY) LTD, Stellenbosch (CA)

(72) Inventors: Sarel Jacobus Marais, Stellenbosch (CA); Nicholas Ian Longley, Stellenbosch (CA); Nardus Matthysen, Stellenbosch (CA)

(73) Assignee: ALPHAWAVE GOLF (PTY) LTD, Stellenbosch (ZA)

( * ) Notice: Subject to any disclaimer, the term of this patent is extended or adjusted under 35 U.S.C. 154(b) by 643 days.

(21) Appl. No.: 17/262,885

(22) PCT Filed: Jul. 25, 2019

(86) PCT No.: PCT/IB2019/056361
§ 371 (c)(1),
(2) Date: Jan. 25, 2021

(87) PCT Pub. No.: WO2020/021488
PCT Pub. Date: Jan. 30, 2020

(65) Prior Publication Data
US 2021/0228943 A1  Jul. 29, 2021

Related U.S. Application Data

(60) Provisional application No. 62/702,951, filed on Jul. 25, 2018.

(51) Int. Cl.
*A63B 24/00* (2006.01)
*A63B 69/36* (2006.01)
(Continued)

(52) U.S. Cl.
CPC ...... *A63B 24/0062* (2013.01); *A63B 24/0021* (2013.01); *A63B 69/36* (2013.01);
(Continued)

(58) Field of Classification Search
None
See application file for complete search history.

(56) References Cited

U.S. PATENT DOCUMENTS 5,588,652 A   12/1996   Lang
6,322,455 B1  11/2001   Howey
(Continued)

FOREIGN PATENT DOCUMENTS

KR   1020130000235   1/2013
KR   1020130103230   9/2013
(Continued)

OTHER PUBLICATIONS

Cited in corresponding Extended European Search Report for PCT/IB2019056361.
(Continued)

*Primary Examiner* — Ronald Laneau
(74) *Attorney, Agent, or Firm* — Heslin Rothenberg Farley & Mesiti, PC

(57) ABSTRACT

There is provided a skill level determination and management system and method. The system includes a sensor for automatically sensing shot data of a golf shot hit by a golfer on a range area towards a target on the range area. A comparing component is provided for comparing an end location of the golf shot to a target location and grading the shot, taking into consideration at least a difference between the end location of the golf shot and the target location, and a skill level associated with the golfer. A skill level management component is provided for updating the skill level associated with the golfer based on the grade.

17 Claims, 9 Drawing Sheets

(51) Int. Cl.
  *A63B 102/32* (2015.01)
  *G06F 17/11* (2006.01)
(52) U.S. Cl.
  CPC .......... *A63B 69/3691* (2013.01); *G06F 17/11* (2013.01); *A63B 2024/0028* (2013.01); *A63B 2024/0056* (2013.01); *A63B 2024/0068* (2013.01); *A63B 2102/32* (2015.10)

(56) References Cited

U.S. PATENT DOCUMENTS

| | | |
|---|---|---|
| 9,542,596 B2 | 1/2017 | Freeman et al. |
| 2007/0149300 A1* | 6/2007 | McNamara, III ...... A63B 71/02 473/168 |
| 2020/0269089 A1* | 8/2020 | Tuxen ..................... G01S 13/88 |
| 2021/0220718 A1* | 7/2021 | Tuxen ................ A63B 69/3623 |

FOREIGN PATENT DOCUMENTS

| | | |
|---|---|---|
| WO | 2009036085 A1 | 3/2009 |
| WO | 2011050419 A1 | 5/2011 |
| WO | 2015/168281 A1 | 11/2015 |
| WO | 2015168281 A1 | 11/2015 |

OTHER PUBLICATIONS

International Search Report and Written Opinion issued in PCT/IB2019/056361 and mailed Dec. 23, 2019.

* cited by examiner

| CATEGORY | AVERAGE NUMBER OF STROKES PER ROUND |
|---|---|
| TEE SHOTS | 14 |
| LONG APPROACH SOTS | 4 |
| MID APPROACH SHOTS | 7 |
| SHORT APPROACH SHOTS | 11 |
| TOTAL | 36 |

| NUMBER OF ACCEPTABLE DIFFERENTIALS AVAILABLE | NUMBER OF DIFFERENTIALS TO USE FOR RANGE HANDICAP CATEGORY CALCULATION |
|---|---|
| 5 OR FEWER | LOWEST 1 |
| 6-8 | LOWEST 2 |
| 9-10 | LOWEST 3 |
| 11-12 | LOWEST 4 |
| 13-14 | LOWEST 5 |
| 15-16 | LOWEST 6 |
| 17 | LOWEST 7 |
| 18 | LOWEST 8 |
| 19 | LOWEST 9 |
| 20 OR MORE | LOWEST 10 |

| SHOT NUMBER | GRADE RELATIVE TO A 12.2 TEE SHOT RANGE HANDICAP CATEGORY |
|---|---|
| 1 | +0.42 |
| 2 | -0.06 |
| 3 | +0.41 |
| 4 | +0.62 |
| 5 | -0.22 |
| 6 | +1.32 |
| 7 | +0.53 |
| 8 | +0.82 |
| 9 | -0.07 |
| 10 | +0.93 |
| 11 | +0.21 |
| 12 | +1.19 |
| 13 | +0.91 |
| AVERAGE | +0.54 |

SKILL LEVEL DETERMINATION AND MANAGEMENT SYSTEM AND METHOD

CROSS REFERENCE TO RELATED APPLICATIONS

This application is a U.S. National Phase filing under 35 U.S.C. § 371 of International Application PCT/IB2019/056361, filed Jul. 25, 2019. PCT/IB2019/056361 claims priority from U.S. provisional patent application No. 62/702,951 filed on 25 Jul. 2018. The entire contents of each of these applications are expressly incorporated by reference herein.

FIELD OF THE INVENTION

This invention relates to golf.

More particularly, but not exclusively, this invention relates to golf shots hit by a golfer on a range area towards a target on the range area.

BACKGROUND TO THE INVENTION

Golf is a club and ball sport wherein a golfer uses various clubs to hit golf balls towards and into holes on a golf course. Many types of practise and training facilities are available to golfers. One such training facility is a driving range or range area where golfers practise to hit golf shots, typically at targets provided on the range area. Practise sessions at range areas are typically a repetitive exercise where the golfer hits many shots, but the golfer is not sufficiently rewarded or incentivised to come back and improve. This causes the experience to be forgettable and many golfers see practise sessions at the range area as a chore. No long-term record of golfers' practise sessions at range areas is kept and generally golfers spend less time on range areas than they should. There does not exist a method for the golfer to score a session at the driving range, or to quantitively determine how well he or she performed during a particular practise session. Therefore, the known range areas and training systems have drawbacks and limitations.

In the early 1990s Peter Sanders developed a concept called "strokes saved/lost analysis". It entailed a special score card that could be completed during a regular round of golf, in order to get a detailed analysis of a golfer's regular golf game for every shot. From all the data collected, a model called "Mr Scratch" was created, which represents the average number of strokes to hole out from every position and distance on a regular golf course.

Mark Broadie, in turn, developed a concept called "Strokes Gained" and he created a program called "Golfmetrics" to capture golf data. Broadie believed that there existed a better way of valuing each shot and giving a user a specific number that indicates the value of each shot on a regular golf course. In 2003, Broadie obtained access to the PGA Tour's data collection system, marketed as "ShotLink"™. By using this data, Broadie published his first Strokes Gained results in 2008. In 2013, Broadie's popular book "Every Shot Counts" was published, which details the strokes gained methodology and describes the average number of shots to hole out from various different lies and distances on a regular golf course. The book explains that traditional statistics such as greens-in-regulation and total driving do not really provide useful information about a golfer's strengths and weaknesses or how well he/she played in a round. In the book, Broadie also explains the "Strokes Gained" concept, how it works, and how a value is calculated for every golf shot on a regular golf course in a way that is intuitive and easily understandable to golfers.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a skill level determination and management system, the system including a memory for storing computer-readable program code and a processor for executing the computer-readable program code, the system including:

a sensor for sensing shot data of a golf shot hit by a golfer towards a target;

a comparing component for comparing an end location associated with the golf shot to a target location and grading the shot, taking into consideration at least a difference between the end location and the target location, and a skill level associated with the golfer; and a skill level management component for updating the skill level associated with the golfer based on the grade.

Further features provide for the skill level to be updated based on the grade of each of a plurality of golf shots; and for the system to be configured for automatically sensing golf shots hit by the golfer on a range area.

A still further feature provides for the shot data to include sensed trajectory data of a golf ball hit by the golfer from a start location.

Yet further features provide for each of the start location and target location to be sensed or to be predefined, for data relating to the start and target locations to form part of the shot data; and for the target location to be a location of the target, alternatively for the target to be a region or area that the golfer aims at when hitting the golf shot.

A further feature provides for the start location or the end location to be an estimated region on the range area that is estimated by utilising the trajectory data of the golf ball; alternatively, for the start location or the end location to be sensed by the sensor.

A still further feature provides for the skill level associated with the golfer to be updated in real-time or near real-time, or at predefined time intervals, or periodically, or repeatedly.

Yet further features provide for the shot data and/or the trajectory data to be utilised to assign the golf shot into one of at least two categories; and for the at least two categories to represent different types of golf shots.

Further features provide for the skill level to be divisible into at least two skill level categories corresponding to the at least two golf shot categories.

Still further features provide for the skill level management component to be configured to determine and/or to manage the skill level based on a weighted calculation using at least two skill level categories; for a weight allocated to each skill level category to be calculated based on an average number of shots in the corresponding shot category that a golfer of similar skill to the golfer usually hits during a round of golf (or on a golf course); and for the skill level to be calculated using the formula:

$$\text{Range\_HC} = x \cdot \text{ShotCategory1\_HC} + y \cdot \text{ShotCategory2\_HC} + \ldots + z \cdot \text{ShotCategoryN\_HC}$$

wherein:
1. Range_HC is the skill level of the golfer;
2. ShotCategory1_HC is a first shot category skill level of the golfer;
3. ShotCategory2_HC is a second shot category skill level of the golfer;
4. ShotCategoryN_HC is an $N^{th}$ shot category skill level of the golfer; and
5. x, y, and z are the respective weights allocated to ShotCategory1_HC, ShotCategory2_HC, and ShotCategoryN_HC of the golfer.

Yet further features provide for the system to be configured to automatically sense a plurality of shots that may be grouped into a session; and for the comparing component to utilise only valid shot data from the plurality of sensed shots in the session to grade each of the shots as well as the session as a whole; for the session to require at least a minimum number of shots in order to qualify as a valid session; and for the skill level to be updated after a session at the range area; for the skill level to be updated after the session using a differential which is calculated as a difference between the skill level (or the particular skill level category) and an average grade for all the valid shots within the particular category for the session relative to the golfer's current skill level category; and for the skill level categories to be updated based on a limited number of differentials.

Further features provide for the range area to be an outdoor range area such as an outdoor driving range, practice range, practice facility, or an indoor area such as an indoor driving range or any other indoor or outdoor golf facility or a virtual range area, including indoor golf simulators.

Still further features provide for the target to be a physical target or a virtual target; for the virtual target to be displayed on a screen, or projected onto a wall in the indoor area; for the target to be a point target such as a physical post and at least one target zone around the point target, for example a zone allocated (physically and/or virtually) on the outdoor range or a zone allocated on the screen or on the wall in the indoor area when the range area is a virtual range area; for the target zone to be shaped and/or sized relative to the skill level of the golfer; and for the target zone to be shaped and/or sized relative to a distance between the point target and the start location; and for the target zone to be divided into a green zone and a fairway zone; and for a part of the range area that does not form part of the green or fairway zones to be categorised as a rough zone.

Yet further features provide for the system to include a plurality of sensors; for the sensors that sense the trajectory of the ball flight to be radar sensors, alternatively for one or more optical or camera sensors to be provided or any other sensor technology capable of sensing the ball flight trajectory with the plurality of sensors; alternatively for the sensor to be in the form of a launch monitor that senses at least a portion of the actual ball flight trajectory, and/or that calculates a potential ball flight trajectory based on the sensed portion of the actual trajectory or alternatively, based only on measured or sensed launch parameters such as launch velocity, spin rate and spin axis of the ball.

Further features provide for a hypothetical lie type or lie quality of the ball to be determined or estimated based on the shot data and/or based on the end location of the golf shot (or the estimation of the end location); for the lie type to be determined as a green lie when the end location of the golf shot is located inside the green zone; and for the lie type to be determined as a fairway lie when the end location of the golf shot is located inside the fairway zone; and for the lie type to be determined as a rough lie when the end location of the golf shot is located inside the rough zone.

A still further feature provides for the lie type or lie quality to be taken into consideration when grading the golf shot and/or when calculating the skill level of the golfer.

Yet further features provide for the system to be arranged to manage a plurality of skill levels for a plurality of golfers; for the system to enable the plurality of golfers to compete against one another using the system; and for each of the plurality of golfers to be enabled to hit golf shots from a plurality of starting locations at the range area.

Further features provide for the system to include a backend server which may be a remote backend server such as a cloud-based server including a database; for the system to include a local computing device for receiving the shot data from the sensor; for the system to include a user device associated with the golfer; for the golfer to be registered for use of the system; and for an application to be operable or executable on the user device of the golfer to facilitate operation of the system.

Still further features provide for a terminal device to be provided at the range area; for the terminal device to include a display provided to display the skill level of the golfer; for the display to be a physical display at the range area, alternatively for the display to be a display associated with the user device of the golfer; for the display to be associated with the start location; and for the application to be operable on a computing device associated with the display that may be fixed at the start location to enable the golfer to interact therewith.

In accordance with a further aspect of the invention there is provided a computer-implemented method for managing a skill level, the method comprising:
  receiving shot data from a sensor for sensing shot data of a golf shot hit by a golfer towards a target;
  comparing an end location associated with the golf shot to a target location;
  grading the shot taking into consideration at least a difference between the target location and the end location, and a skill level associated with the golfer; and
  updating the skill level of the golfer based on the grade.

Further features provide for the skill level to be in the form of a skill level associated with the golfer; for the computer-implemented method to be a computer-implemented method for managing the skill level; and for the skill level to be updated based on the grade of a plurality of golf shots; and for the method to include automatically sensing golf shots hit by the golfer on a range area.

Still further features provide for the method to include utilising a plurality of sensors for automatically sensing shot data of the golf shot hit by the golfer on the range area at the target on the range area; and for the target to be a physical target, a target zone, or a virtual target.

A yet further feature provides for the method to include updating the skill level of the golfer based on aggregate grades of a plurality of golf shots hit during one or more sessions at the range area.

In accordance with a further aspect of the invention there is provided a computer program product for managing a skill level, the computer program product comprising a computer-readable medium having stored computer-readable program code for performing the steps of:
  receiving shot data from a sensor for sensing shot data of a golf shot hit by a golfer towards a target;
  comparing an end location associated with the golf shot to a target location;

grading the shot taking into consideration at least a difference between the target location and the end location, and a skill level associated with the golfer; and updating the skill level of the golfer based on the grade.

Further features provide for the skill level to be associated with the golfer; for the computer program product be a computer program product for managing the skill level; and for the skill level to be updated based on the grade of a plurality of golf shots.

Still further features provide for the computer program product to include utilising a plurality of sensors for automatically sensing shot data of the golf shot hit by the golfer on a range area at the target on the range area; and for the target to be a physical target, a target zone, or a virtual target.

A yet further feature provides for the computer program product to include updating the skill level of the golfer based on aggregate grades of a plurality of golf shots hit during one or more sessions at the range area.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

A system (10) and a method (100) for determining and managing a skill level are shown in the figures. Throughout the figures, like features are referenced with like numerals. In an embodiment of the invention, the skill level may be in the form of a range handicap, and the system (10) and method (100) are in the form of a range handicap determination and management system and method, however the invention extends to the determination and management of other forms of skill level.

Figure 1:
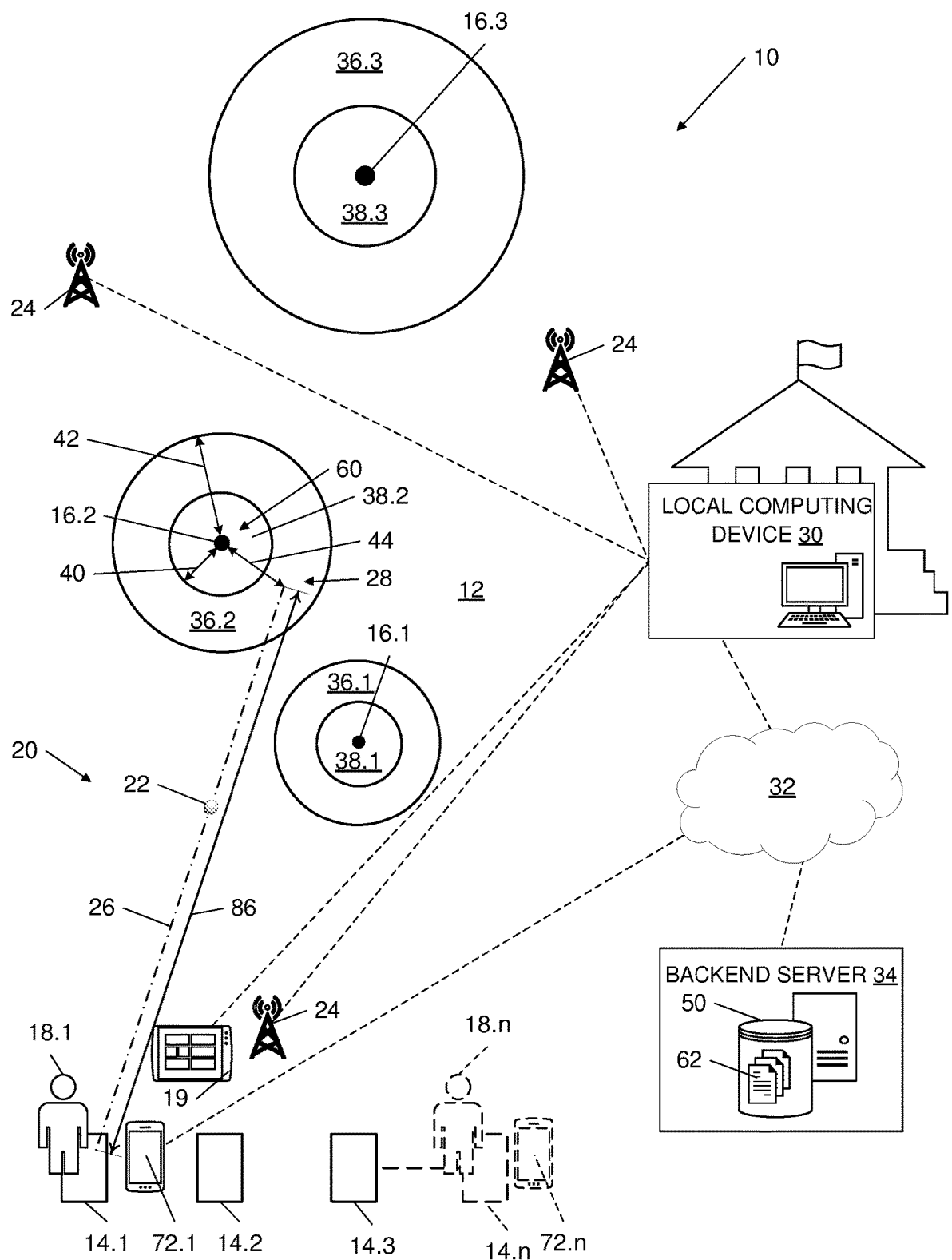
FIG. 1 is a schematic high-level diagram of an example embodiment of a skill level determination and management system in the form of a skill level determination and management system implemented at a range area.
Figure 1A:
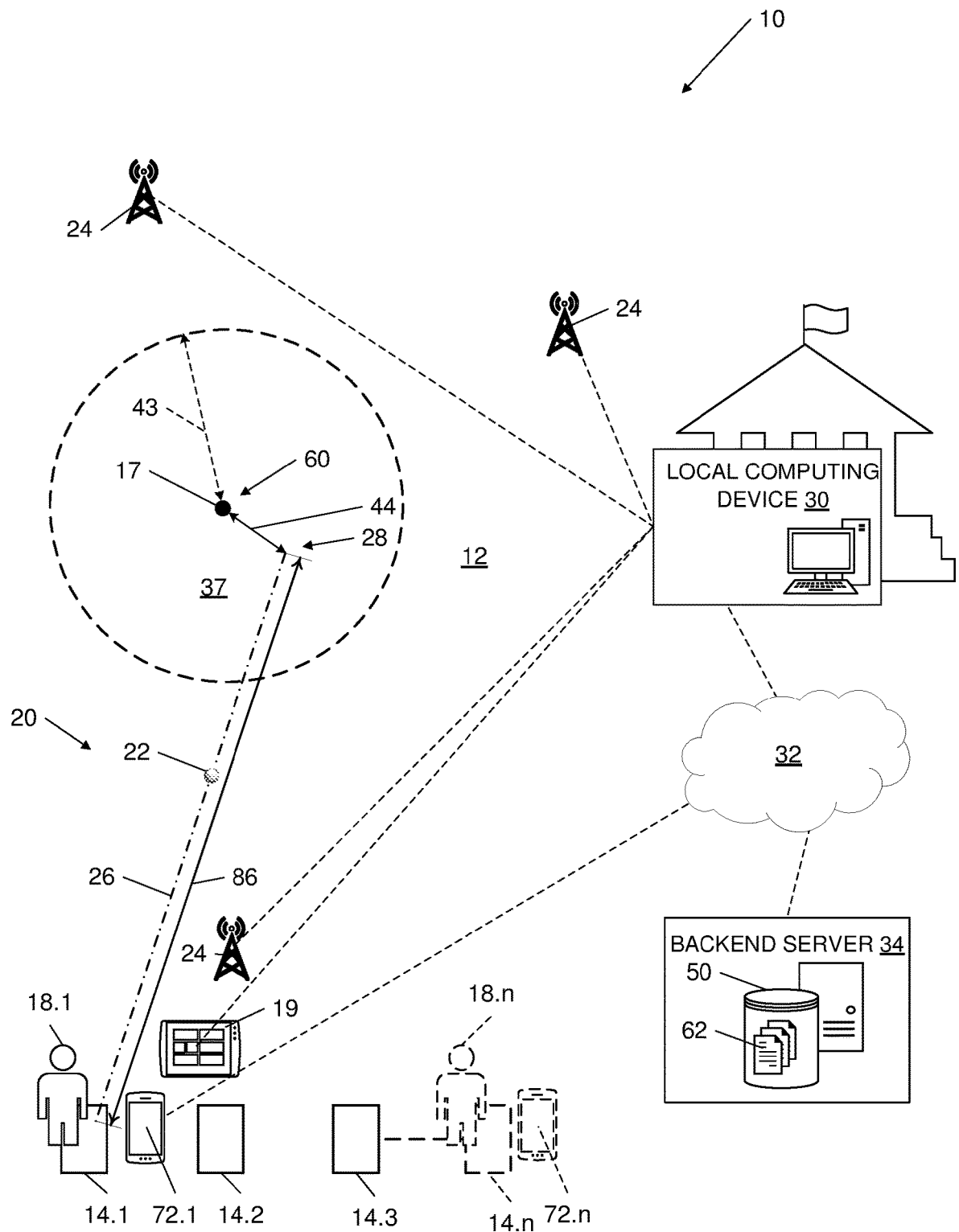
FIG. 1A is a schematic high-level diagram of a further example embodiment of a skill level determination and management system implemented at the range area.

Referring to FIGS. 1 and 1A, the skill level determination and management system (10) is provided at a range area (12) such as an outdoor or indoor driving range facility or practise facility. A plurality of start locations (14.1) to (14.n) or tee areas may be provided at the range area (12), and in the example embodiment shown in FIG. 1, first, second and third targets or target posts (16.1, 16.2, 16.3) are provided at increasing distances from the start location (14.1). One or more of the targets may be physical or virtual targets, as will be described in more detail below. A golfer (18.1) hits an example golf shot (20) wherein a golf ball (22) is hit by a golf club (not shown) of the golfer (18.1), for example at the second target (16.2). One or more sensors (24) may be provided at the range area (12) for sensing shot data of the golf shot (20). The shot data may include: data of a flight path or trajectory (26) of the golf ball (22), data of the start location (14.1) (or data of an estimated region of the start location) and data of the end region or end location (28) (which may be an estimated location) associated with the golf ball (22) after it is hit by the golfer (18.1). The start location or the end location may be derived from the sensed shot data (or from the trajectory data of the golf ball). It will be appreciated that the trajectory (26) may be a three-dimensional trajectory comprising curvature and elevation (and comprising varying amounts of draw or fade as result of spin rate of the ball as is known in the art) even though it is illustrated in two dimensions in FIGS. 1 and 1A. A local computing device (30) may be provided locally at or near the range area (12) and may be configured to receive the shot data from the one or more sensors (24). The local computing device (30) may also be in communication via a communications path such as the Internet (32) with a backend server (34). However, embodiments are possible wherein the backend server (34) forms part of, or is provided by the local computing device (30) or a separate computing device on the local network. The targets (16.1, 16.2, 16.3) may each have surrounding larger target zones (36.1, 36.2, 36.3) and smaller target zones (38.1, 38.2, 38.3). In the example embodiment shown, the second target post (16.2) is surrounded by a circular green zone (38.2) with a first radius (40), and a concentric fairway zone (36.2) with a second and larger radius (42) is provided. Areas on the range area (12) that do not fall within the fairway and green zones may be classified or regarded as rough zones or rough areas by the system (10). The example golf shot (20) hit by the golfer (18.1) at the second target post (16.2) ended up in the fairway zone (36.2) a distance (44) from the target post (16.2) as indicated by the dashed lines between the start location (14.1) and the end location (28). The sensor(s) (24)

may be arranged for sensing the shot data including the end location (28) of the golf shot hit by the golfer. The shot data may be sensed automatically. The sensor(s) (24) may for example be one or more radar sensors to sense the trajectory or flight path of the golf ball (22). Alternatively, a launch monitor may be used, for example the sensor that is closest to the golfer (18.1) or provided behind the golfer may be in the form of a launch monitor. Optical or camera-based tracking devices may also be used, or any other sensing technology that may arise which is capable of sensing and/or estimating the trajectory (26) or flight path of the golf ball (22).

Figure 2:
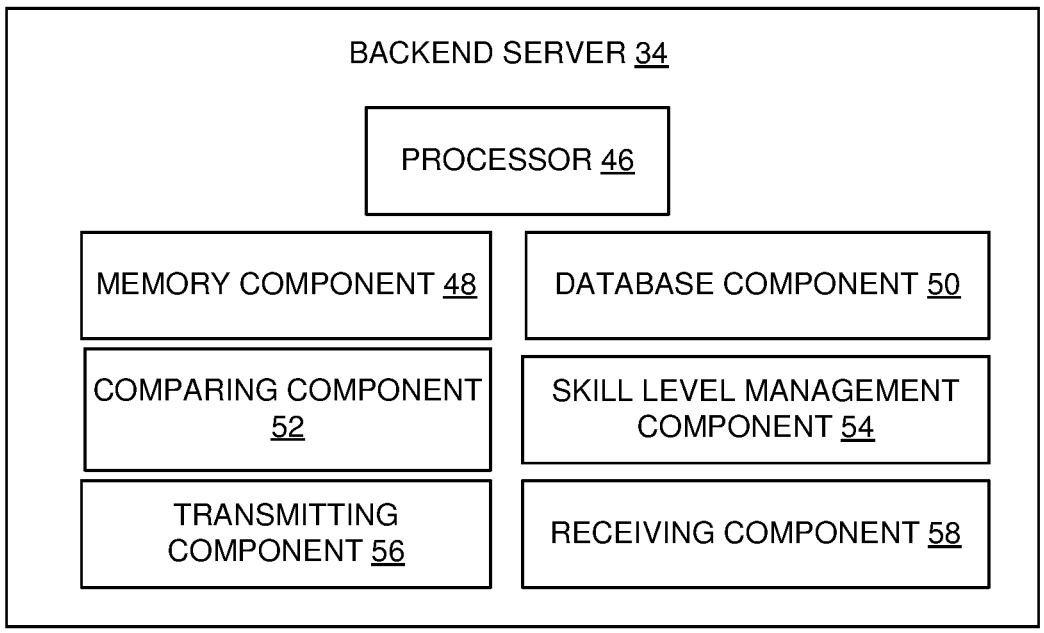
FIG. 2 is a high-level block diagram of a backend server which may form part of the system of FIGS. 1 and 1A.
Figure 3:
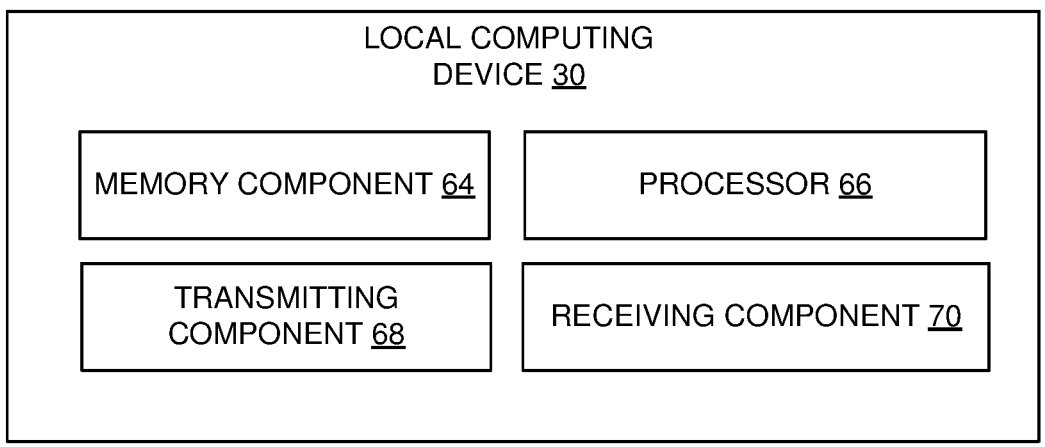
FIG. 3 is a high-level block diagram of a local computing device which may form part of the system of FIGS. 1 and 1A.
Figure 4:
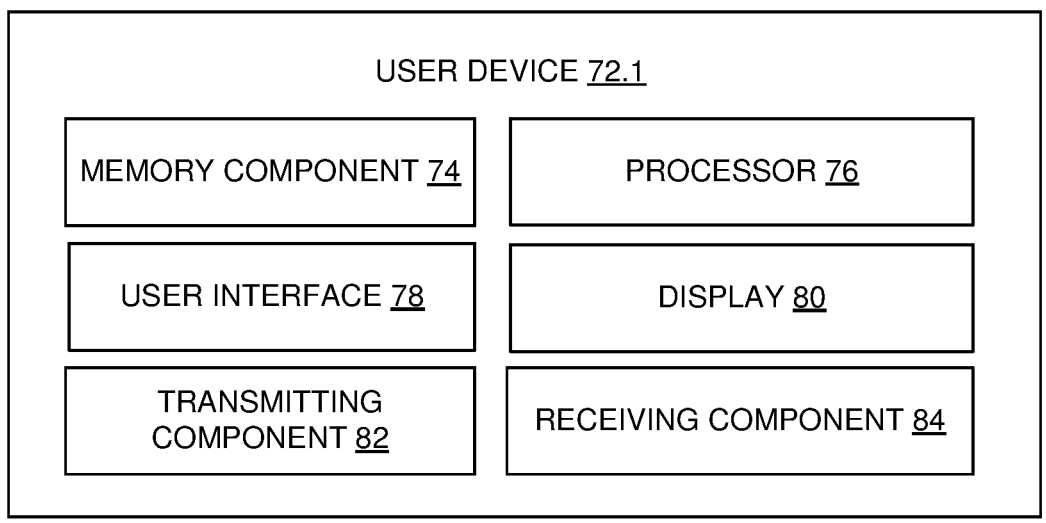
FIG. 4 is a block diagram of a user device forming part of the system of FIGS. 1 and 1A.

FIG. 2 shows a high-level block diagram of the backend server (34) that may form part of the system (10). The backend server may include a processor (46), a memory component (48), a database component (50), a comparing component (52), a skill level management component (54), a transmitting component (56) and a receiving component (58). The comparing component (52) may be arranged for comparing the end location (28) (or an estimation thereof) of the golf shot (20) to a target location (60) of the target (16.2) (or other relevant target) to determine a difference (44) between the end (28) and target (60) locations. The target location (60) may be a location of the target (16.2). Alternatively, the target may be a region or area that the golfer aims at when hitting the golf shot. The comparing component (52) may further be arranged to grade the golf shot by taking into consideration at least the difference (44) between the end (28) and target (60) locations and a skill level, which may be in the form of a range handicap, associated with the golfer (18.1) as will be explained in more detail below. The skill level management component (54) may be utilised to determine and/or to update a range handicap or skill level (62) for the golfer (18.1) based on the grade of individual shots, or aggregate grades of groupings of shots in one or more sessions, as discussed in more detail below. The skill level of the golfer (18.1) may be stored in the database component (50) of the system (10). In FIG. 3, more detail of the local computing device (30) is shown, including a memory component (64), a processor (66), a transmitting component (68) and a receiving component (70). In FIG. 4 more detail of a user device (72.1) (also shown in FIGS. 1 and 1A), associated with the golfer (18.1) is shown. The user device (72.1) may include a memory component (74), a processor (76), a user interface (78), a display (80), a transmitting component (82) and a receiving component (84). The user device (72.1) may for example be a mobile device associated with the golfer or user (18.1), or any other type of computing device (fixed or moveable) capable of providing an interface between the user or golfer (18.1) and the system (10). The backend server (34) may be in data communication with the user device (72.1) of the golfer (18.1), in this embodiment over the Internet (32). The user device (72.1) may be registered for use of the system (10), and in the present embodiment, an application (such as a purpose-created mobile application or "app") may operate on the user device (72.1) and facilitate operation of the system and method of the present invention. The various components of the system may be in wired or wireless communications with each other.

Referring to FIG. 1A, a further example embodiment of the system (10) is shown with a physical or virtual target (17) which may be any target or region allocated on the range area. Instead of utilising the green zones (38.1, 38.2, 38.3), fairway zones (36.1, 36.2, 36.3) and rough zones of FIG. 1, only the distance (44) (or an estimated distance, or a virtual distance) from the target (17) may be required by the system (10) to grade the shot. The application may also include an overlay or superposition of a virtual fairway on a model of the range area (12) that the golfer (18.1) can hit golf shots towards. I.e. target (17) need not be a physical target on the range area (12), but physical target(s) may be used as references to allow the golfer (18.1) to position a virtual fairway within the application. Alternatively, the golfer (18.1) may be enabled to position the location of the target (17) virtually. For example, the golfer (18.1) may be prompted to select a fairway target via the app when hitting drives and to select a point target or green zone when hitting approach shots. These virtual targets may be used for tee shots or for approach shots as will be discussed in further detail below. Referring to FIGS. 1 and 1A, in some implementations, the user device (72.1) may be replaced, or supplemented by, a terminal device (19), or other computing device which may include a display, and which may for example be provided at the range area (12). The terminal device (19) may be associated with the start location (14.1) which may also be referred to as a bay. Components of the terminal device (19) may be similar to the components of the user device (72) described above with reference to FIG. 4. The application may be operable on a computing device associated with the terminal device (19), or on the terminal device (19) itself. The terminal device (19) may be fixed at the start location to enable the golfer (18.1) to interact therewith. Configuration of the features or any of the functionalities of the application described with reference to the user device (72.1) may also be performed on the computing device associated with the terminal device (19), or on the terminal device itself. A zero grade target zone (37) with a radius (43) may be provided, as will be discussed in further detail below with reference to FIG. 13. The app may also be downloadable, installable and executable on the local computing device (30), on the user device (72.1) and/or on the terminal device (19).

Figure 5:
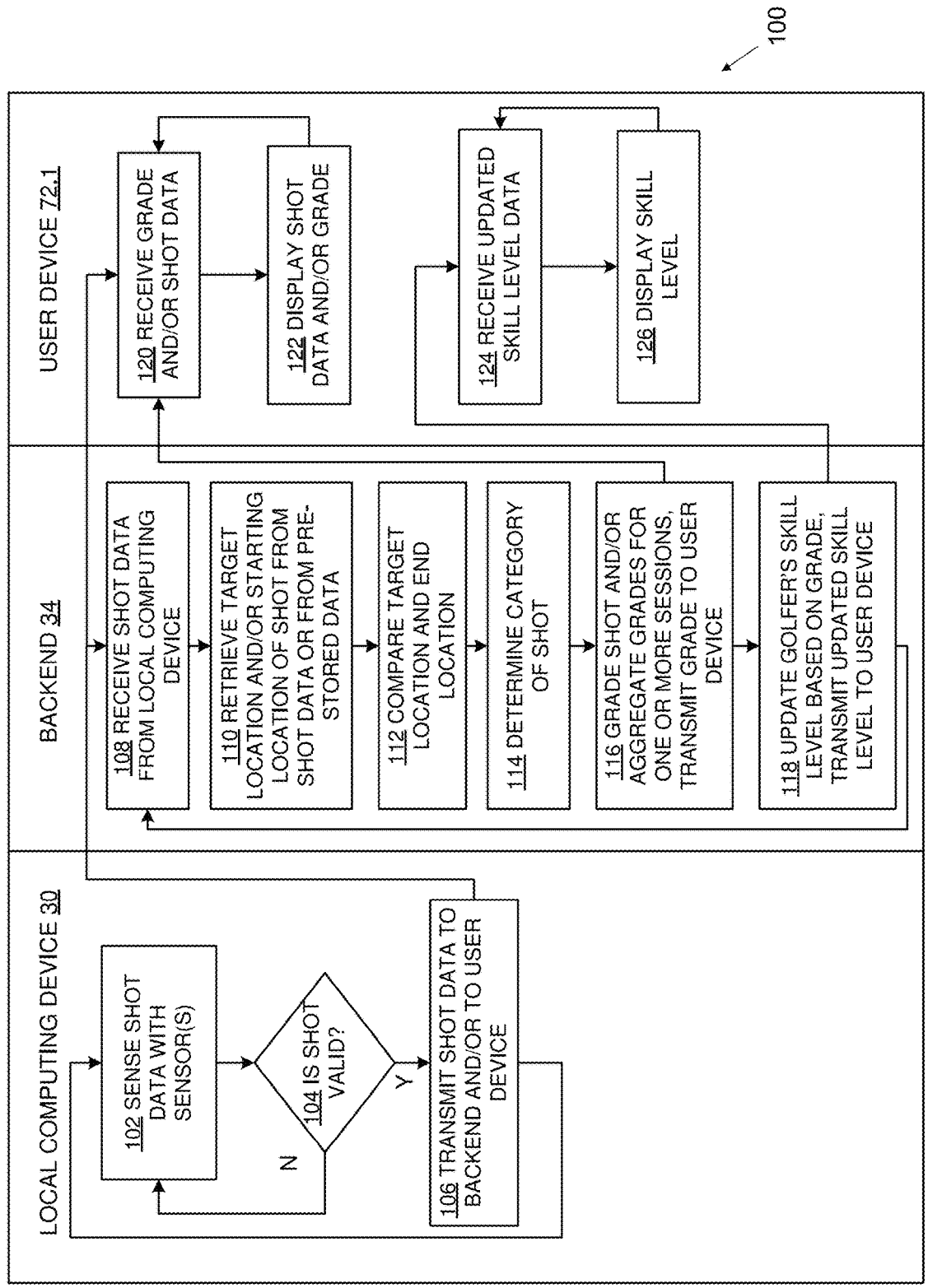
FIG. 5 is a swim-lane flow diagram illustrating an example of a method of managing a skill level using the system of FIG. 1 or 1A.

The system (10) described above may implement a method (100) for managing the skill level. An example method for managing the skill level is illustrated in the swim-lane flow diagram (100) of FIG. 5 (in which respective swim-lanes delineate steps, operations or procedures performed by respective entities or devices). Steps as they are performed by the local computing device (30) (shown in FIGS. 1, 1A and 3), the backend server (34) (shown in FIGS. 1, 1A and 2), and the user device (72.1) (shown in FIGS. 1, 1A and 4) are illustrated in FIG. 5. It will be appreciated that embodiments are possible wherein the backend server (34) may be provided by, or form part of, the local computing device (30) and the steps performed by the backend (34) may be performed by the local computing device (30), or the steps performed by the local computing device may be performed by the backend (34).

At the range area (12), the sensors (24) may sense (102) shot data of a plurality of golf shots hit by the golfer (18.1) including the golf shot (20) described above and/or other golf shots. If it is determined (104) that the shot data for the particular shot is valid, the shot data may be transmitted (106) to the backend server (34) and/or to the user device (72.1). If the shot data is not valid, the sensor(s) may continue to sense shot data of further shots hit by the golfer (18.1).

The backend server (34) may receive (108) the shot data from the local computing device (30) or from the sensor(s) (24). The backend server (34) may then retrieve (110) the target location (60) and/or the starting location (14.1) of the relevant golf shot (20) from the shot data or from pre-stored data in the database component (50), or from another database. As discussed above, the golfer (18.1) may for example be prompted via the app to specify their intent, for example to select a physical or virtual target (such as a green zone or point target for approach shots) or a physical or virtual fairway (for tee shots). The end location (28) may be estimated or may be determined based on the shot data received from the local computing device (30). The comparing component (52) of the backend server (34) may then compare (112) the target location (60) to the end location (28) to determine a difference (44) between the target location (60) and the end location (28). A category of the shot may be determined (114) by the backend server (34) as will be described in more detail below with reference to FIG. 6. The category of the golf shot may alternatively be determined before the step (112), based on input received from the golfer (18.1), before the shot is hit. Then, the comparing component (52) of the backend server (34) may grade the shot (116) taking into consideration at least the difference between the target location (60) and the end location (28) and the skill level (62) or skill level category of the golfer (18.1). An aggregation of grades of shots for a particular session may also be performed to determine a session category score (also referred to as a differential), which may then be used to calculate the skill level for that category (and an overall skill level) as will be discussed in further detail below. The grade may be transmitted to the user device (72.1) of the golfer (18.1) (or to the local computing device (30), or to the computing device associated with the terminal device (19)). Next, the backend server (34) may update (118) the skill level of the golfer (18.1) based on the grade (or, if the golfer does not yet have a skill level, a skill level may be determined, for example when a required number of shots has been hit by the golfer (18.1)). The updated skill level may be transmitted to the user device (72.1) of the golfer (18.1). Steps (108 to 118) may be repeated at the backend (34), or at the local computing device (30), or at the user device (72.1) as necessary. The user device (72.1) may receive (120) the grade from the backend (34) and/or the shot data from the local computing device (30), and the shot data and/or the grade may be displayed (122) on the display (80) of the user device (72.1). The user device (72.1) may receive (124) data relating to the updated skill level from the backend (34) and/or may display (126) the updated skill level of the golfer (18.1) on the display (80) of the user device (72.1). The skill level may be updated in near real-time and/or dynamically, after a session at the range area (12), at predetermined time intervals, or repeatedly as will be discussed below. It should be appreciated that the steps performed on the user device (72.1) may alternatively be performed on the computing device associated with the terminal device (19) which may include a display thereat.

In the embodiment shown in FIG. 1, the shot data includes sensed trajectory data of a flight path (26) of the golf ball (22) from where the system (10) may determine or derive the starting location (14.1), the end location or region (28) and also a horizontal distance (86) between the start and end locations from the sensed shot data. The distance (86) may be calculated as a scalar or as a vector and may also be calculated as differences in geographical coordinates of the start and end locations. Multilateration may for example be used in determining the trajectory (26) and/or the distance (86) between the start and end locations of the golf ball (22). It is also possible for data relating to the start location (14.1) and data relating to the targets (16.1, 16.2, 16.3) and/or target zones (36.1, 36.2, 36.3, 38.1, 38.2, 38.3) to be predefined or pre-stored at the local computing device (30) or at the backend (34), or other implementations are possible, for example as described above with reference to FIG. 1A. The start location (14.1), and/or end location (28) may be an estimated region on the range area (12) that is estimated by utilising the trajectory data of the golf ball (22) forming part of the shot data. Data relating to the target location (60) may be pre-stored or may for example be input by the golfer (18.1) using the app.

Figures 6, 7, 8:
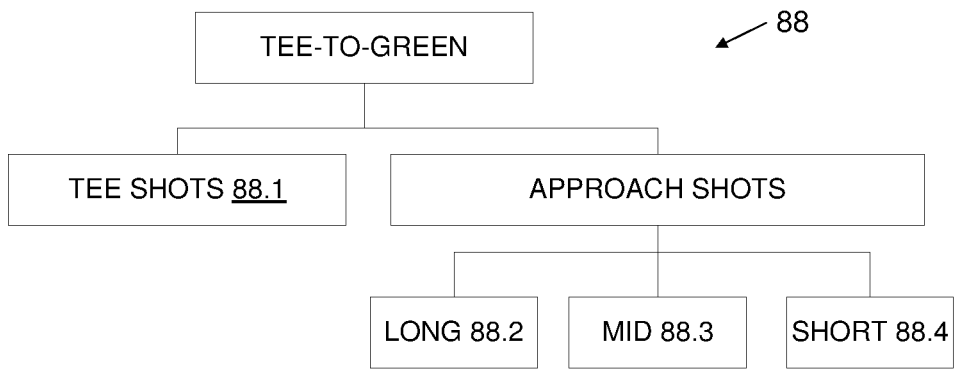
FIG. 6 is a block diagram illustrating potential categories into which golf shots may be assigned.
FIG. 7 is a table showing an illustrative example of the average number of strokes per category that a certain type of golfer may hit on average during a regular round of golf.
FIG. 8 is a table showing the number of differentials that may be used to calculate a skill level category of a golfer.

Referring to the block diagram in FIG. 6, the shot data and/or the trajectory data may be utilised to assign the golf shot (20) into one of at least two categories (88). The at least two categories (88) may include a tee shot category (88.1) and an approach shot category. These form part of what is referred to in the art as tee-to-green shots. As an example, each golf shot (20) may be assigned into one of four categories: the tee shot category (88.1), a long approach shot category (88.2), a mid approach shot category (88.3) and a short approach shot category (88.4). It should be understood that other types of categories may also be used. Approach shots may be defined as shots hit towards targets at a specific distance, whereas tee shots may be defined as shots hit towards a fairway or virtual fairway in a specific direction. As will be understood by a person skilled in the art, the distance (86) of the approach shots forming part of the above approach shot categories increases. In other words, the short approach shot category (88.4) is the shortest, followed by the mid approach shot category (88.3) and then the long approach shot category (88.2). Hence, each golf shot may be categorised by the system (10) according to a distance between the start location (14.1) and the end location (28) (or estimations thereof), and/or an input indicating the specified intent of the golfer (18.1) (the intent relating to the type or category of shot the golfer intends to hit, and the specific target the golfer intends to hit towards). The distances used for distinguishing between shot categories may be adjusted according to the skill level (62) or range handicap of the relevant golfer. Tee shots (88.1) may be categorised (or identified) by input from the golfer (18.1) via the app (the golfer inputs into the app that he/she is about to hit tee shots). Alternatively, the tee shots (88.1) may be categorised by distance, for example by utilising the sensor(s) (24). Within the application, the golfer (18.1) can select either "approach shots" by selecting a specific target on the range area (12), or "tee shot" whereby he/she positions a virtual fairway on the range area (12) at which tee shots are then aimed. This may use a form of augmented reality or virtual reality. The approach shots (88.2, 88.3, 88.4) may be categorized by distances measured by the sensor(s) (24), and may be personalised for every golfer (18.1 to 18.*n*) based on how far he/she generally hits their clubs.

The skill level (62) is in the example embodiment divisible into at least two skill level categories corresponding to the at least two golf shot categories (88.1, 88.2, 88.3, 88.4). The at least two skill level categories may include a tee shot skill level category, a long approach shot skill level category, a mid approach shot skill level category and a short approach shot skill level category. The system (10) may be configured to inhibit golfers (18.1 to 18.*n*) from improving their skill level by only hitting shots from the categories that they are good at. The skill level management component (54) may be configured to determine the skill level (62) based on a weighted calculation of the at least two skill level categories, and in the example embodiment, based on a weighted calculation of each of the four skill level categories. These may also be referred to as range handicap categories. A weight may then be allocated to each skill level category or handicap category, to be calculated based on an average number of shots in the corresponding shot category that a golfer of similar skill to the golfer (18.1) usually hits on a golf course or during a round of golf. The weighted factors may sum to 1. An example of the average number of strokes or shots hit in a round of golf for the example golfer (18.1) is shown in a table (92) in FIG. 7. The system may be arranged to take a type of the golfer into account, as well as a skill level of the golfer. Examples of types of golfers may include the golfer's age, sex, whether the golfer is a professional, an amateur or a beginner, etc. Hence, a typical golfer of a type and skill level may be estimated to hit 14 tee shots, 4 long approach shots, 7 mid approach shots, and 11 short approach shots during a regular golf round of 18 holes (the remainder of the strokes being played on or near the green). It should be appreciated that the numbers used in FIG. 7 are for illustrative purposes only, and may vary significantly when the system (10) is implemented. In an example embodiment, where the skill level may be in the form of a range handicap, the system (10) may be configured to calculate or determine the range handicap for a golfer (18.1) using the following formula, weighted calculation or equation:

$$\text{Range\_HC} = w \cdot \text{TeeShot\_HC} + x \cdot \text{LongAppr\_HC} + y \cdot \text{MidAppr\_HC} + z \cdot \text{ShortAppr\_HC}$$

wherein:
1. Range_HC is the range handicap of the golfer;
2. TeeShot_HC is the tee shot range handicap category of the golfer;
3. LongAppr_HC is the long approach shot range handicap category of the golfer;
4. MidAppr_HC is the mid approach shot range handicap category of the golfer;
5. ShortAppr_HC is the short approach shot range handicap category of the golfer; and
6. w, x, y, and z are the respective weights allocated to TeeShot_HC, LongAppr_HC, MidAppr_HC and ShortAppr_HC of the golfer. These weights may add to 1.

In a more general implementation, the skill level (62) may be calculated, or determined as follows:

$$\text{Range\_HC} = x \cdot \text{ShotCategory1\_HC} + y \cdot \text{ShotCategory2\_HC} + \ldots + z \cdot \text{ShotCategoryN\_HC}$$

wherein:
1. Range_HC is the skill level of the golfer;
2. ShotCategory1_HC is a first shot category skill level of the golfer;
3. ShotCategory2_HC is a second shot category skill level of the golfer;
4. ShotCategoryN_HC is an $N^{th}$ shot category skill level of the golfer; and
5. x, y, and z are the respective weights allocated to ShotCategory1_HC, ShotCategory2_HC, and ShotCategoryN_HC of the golfer.

It should be understood that. in some implementations, the skill level of the golfer may be referred to as a range handicap. A reference to range handicap may include a reference to skill level, and a reference to skill level may include a reference to range handicap. The range handicap categories may also be referred to, more generally, as skill level categories.

For the illustrative example of FIG. 7, an initial skill level, range handicap or benchmark for the golfer (18.1) may be calculated for w=14/36; x=4/36; y=7/36; and z=11/36. Thus, hitting a lot of shots with a 7 iron towards a 150 m target will only improve the golfer's mid approach shot range handicap category according to the weight y allocated thereto. Stated differently, the golfer's range handicap or skill level is only improved by a limited percentage for each range handicap category or skill level category. The shots with the 7 iron (or shots towards any target distance in the mid approach shot category for the particular golfer) may only contribute towards about (7/36)=19.4% of the range handicap of the golfer. This is also true for the other range handicap categories (short approach, long approach and tee). For the golfer to improve his or her overall range handicap or Range_HC (or skill level), the golfer preferably needs to perform better in all the range handicap categories, and in particular those corresponding to the shots that are typically hit more often during a regular game of golf as depicted in FIG. 7. However, the golfer may decide to hit only one club during a session at the range area (12) to improve one of the four range handicap categories mentioned above. Session scores or grades per handicap category may be used as the units for calculating the category handicaps (or skill levels for each category of shots) (which are then used to calculate the overall range handicap, Range_HC). A new golfer may be required to hit a predefined number of shots in each shot category for the system (10) to perform a calibration step. An initial range handicap or skill level for the new golfer may then be determined using one of the above formulae.

Referring to FIGS. 1 and 2, and the table (94) in FIG. 8, the system (10) may be configured to automatically sense a plurality of tracked golf shots hit by the golfer (14.1) and to group these shots into a session. The grade may be determined relative to the range handicap or skill level of the golfer for each shot, and after each session the grades for the session may be averaged. The average of the grades may then be subtracted from the particular category handicap (or category skill level) of the golfer to obtain a differential for the particular session. Calculation of differentials is also described below with reference to FIG. 12. An example of the number of differentials to use for a calculation of the category handicap of the golfer is shown in the table (94) in FIG. 8 in relation to the number of acceptable differentials available for the golfer. Each session may require at least a minimum number of shots in order to qualify as a valid session.

Old data may also be disregarded so that the range handicap or skill level is a more accurate reflection of the golfer's current skill or ability. For example, the best 10 differentials of the most recent 20 sessions may be used to calculate the range handicap or skill level, or the range handicap categories or skill level categories. There may also be a limitation on the number of sessions per day for the golfer (18.1). Alternatively, all shots hit by a user during a particular day (or any other defined time-frame) may be aggregated into a single unit (often referred to as a session) for the purpose of differential and handicap calculations. The range handicap may then be updated repeatedly or periodically, or after each session at the range area (12), or in near real-time after each shot (if it is a valid shot and not an "outlier" as will be discussed below). The range handicap, skill level, or range handicap or skill level categories may be rounded, for example rounded off to the nearest tenth of an integer.

To explain the differentials, the range handicap or skill level calculations and the range handicap category or skill level category calculations, the following example is provided:

The golfer (18.1) visits the range area (12) and completes eleven sessions hitting only tee shots during each session. The tee shots would for example be aimed towards a physical or virtual fairway on the range. For each shot, the end location of the shot will be sensed (or estimated or otherwise determined) and a difference between the end and target locations may be determined. The target location may for example be the middle part of the fairway or another region or zone that the golfer aims at. The shot is then graded taking into consideration this difference and a range handicap for the golfer (data relating to the range handicap of the golfer is for example stored in the database component (50) of the backend server (34)). After each session, the grades for the session's shots are averaged and the averaged grades are then subtracted from the golfer's tee shot handicap category to calculate the tee shot differential for each session. Let's assume the golfer has the following tee shot differentials after the eleven sessions:

14.4, 12.1, 9.8, 15.0, 13.7, 12.2, 10.1, 8.0, 13.5, 10.2, and 11.6

According to the table (94) in FIG. 8, the lowest four of the above eleven differentials is used for the calculation of the tee shot range handicap category. Thus:

$$TeeShotHC = \frac{(8.0 + 9.8 + 10.1 + 10.2)}{4} = 9.53$$

Let's now assume the golfer (18.1) also has the following handicap categories for the other shot categories:
LongApprHC=12.4
MidApprHC=10.8
ShortApprHC=11.1

The golfer's overall range handicap is then calculated as follows, assuming that the data in FIG. 7 applies:

$$RangeHC = \left(\frac{14}{36}\right) \times 9.5 + \left(\frac{4}{36}\right) \times 12.4 + \left(\frac{7}{36}\right) \times 10.8 + \left(\frac{11}{36}\right) \times 11.1 = 10.56$$

It will be appreciated that other methods of calculating the golfer's skill level may be used, for example methods that only take into account the grade based on the difference (44).

Figure 9:
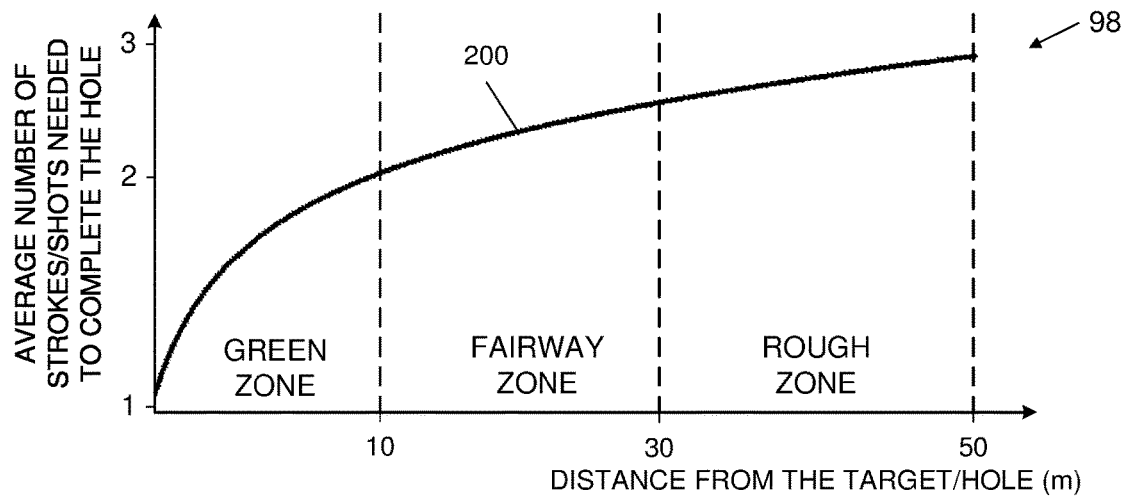
FIG. 9 is a graph illustrating an example of the average number of strokes needed to complete a hole as a function of distance from the target or hole.

In FIG. 9 is shown a graph (98) illustrating an example of the average number of shots or strokes needed to complete a hole as a function of distance from the target (16.1, 16.2, 16.3) or hole, (i.e. the distance (44) between the end (28) and target (60) locations). The graph (98) may correspond to data from professional golfers or to data of amateur golfers of various handicaps. When the distance (44) between the end (28) and target (60) locations is determined, the average number of strokes needed to complete the hole may be derived from the graph (or from corresponding data) by the system (10). The comparing component (52), may utilise the graph (98) to assign the grade to the shot. The graph (98) in FIG. 9 shows a mathematical function for example in the form of a curve (200) which represents short game data i.e. for distances under 50 metres. The mathematical function or curve (200) of FIG. 9 may be extended or extrapolated for golfers of various skill levels or handicaps as illustrated with an example of a three-dimensional surface (202) in the three-dimensional graph (203) depicted in FIG. 10. Different coefficients may for example be used for each golfer to create a continuous curve for increasing distances from the target. The system (10) may utilise data relating to this surface (202) (and/or the graph (203)) and the system may utilise the relevant difference (44) when calculating the average number of strokes needed to complete the hole after a shot is hit on the range area (12) for a golfer of handicap levels 0 to 25 (or skill levels) (or other handicaps of more than 25 or less than 0 if required). The range handicap levels or skill levels need not be integers, for example the golfer (14.1) may have a tee shot range handicap category of 10.2 but a mid approach range handicap category of 12.8. Graphs similar to that in FIG. 10 may be generated for each of the range handicap categories (or for each of the skill level categories), or for the overall range handicap or skill level. It should be appreciated that embodiments may be possible wherein the surface (202) may be smooth or irregular or may include undulations, peaks and/or valleys or other complex forms.

Figures 11, 12:
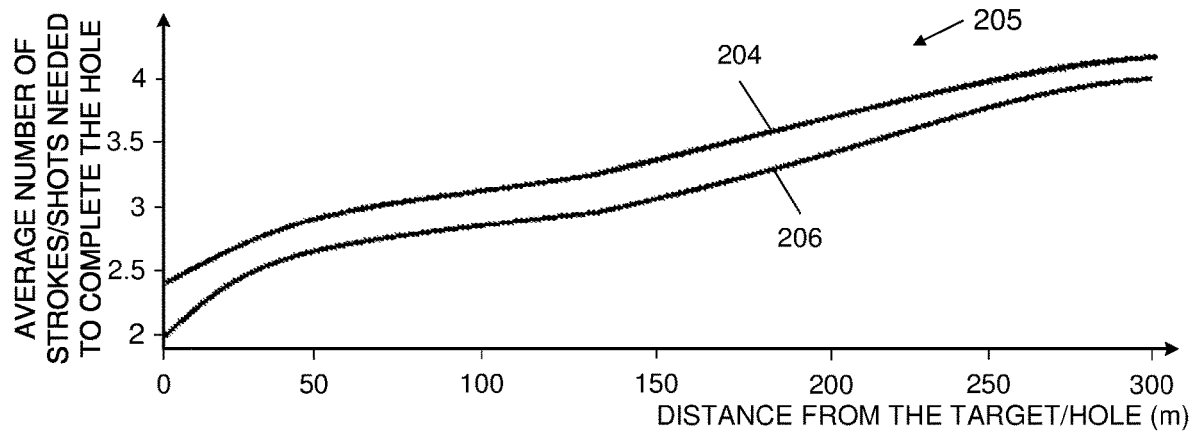
FIG. 11 is a graph illustrating an example of the average number of strokes needed to complete the hole as a function of distance from the hole or target for different lies.
FIG. 12 is a table showing an example of a grade for each of a number of shots hit by the golfer on the range area relative to a skill level category of the golfer.

Referring to FIG. 11, a graph (205) of two mathematical functions is shown for the average number of strokes or shots needed to complete the hole as a function of distance from the hole or target for different lies. The upper function (204) includes data for a rough lie and the lower function (206) includes data for a fairway lie. A similar function or graph may be created for a tee lie or any other lie position that is required. These functions (204, 206) may be utilised by the system (10) to grade shots hit by the golfer by calculating the average number of strokes needed to complete the hole for any measured distance from the target (16.1, 16.2, 16.3, 17) or hole, or from the virtual target. The distance from the target may be sensed by the sensor (24) as described above. Thresholds may be utilised to provide a maximum allowable distance from the target after each shot by the golfer (14.1) to determine which of the shots are valid. For example, the maximum distance to the target may be capped or limited at 200 m after the golfer hits the shot (for example after a total miss-hit or outlier), for the tee shot category. For the short, mid and long approach shot categories the maximum distance to the target may be capped at about 50 m or 75 m or 100 m as required. Other thresholds or maximum distances from the target may be selected as required. It should be appreciated that a graph similar to FIG. 11 may be generated which estimates the number of shots needed to complete the hole (which may be a virtual hole) as a function of only distance from the target/hole and lie type. The four lie types that may for example be taken into account by the system (10) are tee, fairway, rough and green lies. Other lie types such as bunker or sand and the effect of recovery shots may also be taken into account in some implementations.

Figure 10:
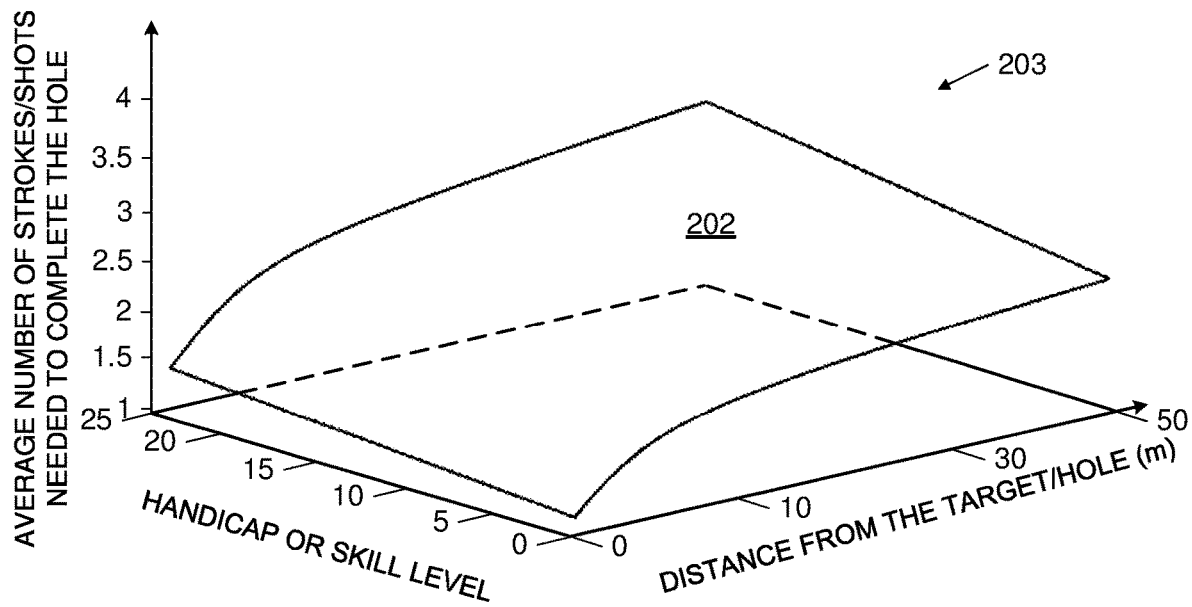
FIG. 10 is a three-dimensional graph illustrating an example of the average number of strokes or shots needed to complete the hole as a function of distance from the target or hole, for a variety of golfers of different handicaps.

As another illustrative example and referring to FIG. 1 and the graphs in FIGS. 9 to 11, to grade the golf shot, when the golfer (14.1) hits the shot (20), the system (10) first calculates the average number of shots needed to complete a simulated hole for the golfer's current range handicap or current skill level (or relevant range handicap category, or skill level category). The necessary number of strokes may depend on the distance between the relevant target and the start location and on the lie type. Let's assume the golfer (18.1) is playing the simulated hole on the range area (12) that is a par 3 with a distance of 150 metres between the starting location (14.1) and the target (16.2). Using data of the graphs in FIGS. 9 to 11, or other pre-stored data or other graphs and/or data, the system (10) may then calculate the average number of shots needed to complete the simulated par 3 from the starting location (14.1) of which the lie type is tee (or a fairway lie in some circumstances). Let's assume the average number of shots needed to complete the simulated hole from the starting location (14.1)=3.5 shots (for the golfer's (18.1) current mid approach shot range handicap category) from the graph in FIG. 11 (or a graph similar to that in FIG. 10, but extended or extrapolated to accommodate further distances from the target than 50 m). The golfer (18.1) now hits the golf shot (20) and the golf shot's end location (28) is determined by the system to be in the fairway (or virtual fairway zone), at the distance (44) from the target post (16.2) or virtual target. The system (10) may then use the determined or estimated distance (44) and the graphs in FIGS. 9 to 11 (or other graphs and other data), to determine the number of shots needed to complete the simulated hole from the end location (28). Let's assume the distance (44) is 12 metres. Utilising the graph in FIG. 9 (or a corresponding graph for the golfer's current range handicap), this translates to about 2.2 shots needed to complete the simulated par 3 from the end location (28). The grade may then be calculated utilising the following formula:

Grade=(shots needed before hitting)−(shots needed after hitting)−1

Thus: Grade=(3.5)−(2.2)−1=+0.3

This formula is a known formula for "Strokes Gained" which was developed by Mark Broadie and was described in his book, Every Shot Counts (also referred to in the background of this specification). The "Strokes Gained" formula is utilised in the embodiment of the invention, however, other methods of calculating a grade for each shot hit by the golfer may also be used.

In other words, the golfer performed better than his own skill level or benchmark (or range handicap) for that particular shot. In the aforementioned example, the golfer would have improved his or her mid approach range handicap category (and also improved his or her overall range handicap by a small amount). Let's now assume the golfer (18.1) hits a next shot at the same target (16.2), but this shot ends up about 50 metres from the target post (16.2). The shots needed before hitting would be the same as the previous example, and the shots needed after hitting would be about 2.8 according to FIG. 9. The grade may then be calculated as:

Grade=(3.5)−(2.8)−1=−0.3

With this shot, the golfer performed worse than his own benchmark, skill level category or range handicap category which would degrade his or her mid approach range handicap category and overall range handicap (unless the shot is classified as an "outlier" during the session as explained above). The system (10) may be arranged to manage a plurality of range handicaps for a plurality of golfers (18.1 to 18.*n*). The system (10) may also enable the plurality of golfers (18.1 to 18.*n*) to compete against one another using the system (10) and/or their user devices (72.1 to 72.*n*). Each of the plurality of golfers (18.1 to 18.*n*) may be enabled to hit golf shots from the plurality of starting locations (14.1 to 14.*n*) at the range area (12). The shots hit by the plurality of golfers (18.1 to 18.*n*) may be tracked simultaneously by the system (10) in near real-time, updating each golfer's range handicap or range handicap categories in near real-time or after each session. The backend server (34) is in the example embodiment a remote backend server such as a cloud-based server with associated database (50), however it may also form part of the local computing device, it may be a separate device on the local network, or it may even be provided by the user device. It should be appreciated that the aforementioned method of calculating the grade is a relative scoring method. It should also be understood that method steps or data processing of the system (10) may be performed on any one of the local computing device (30), the backend server (34), the computing device associated with the terminal device (19), another computing device associated with one of the sensor(s) (24) and/or the user device (72.1). It will further be appreciated that the range handicap (62) and the range handicap categories may be stored on the database (50) of the backend as shown in FIG. 1. Each golfer (18.1 to 18.*n*) may be assigned a unique identification number (UID) and the golfer's range handicap and range handicap categories may be associated with the golfer's UID.

It should be understood that distances referred to in this description may vary, and the invention described herein is not limited to the distances described or referred to. The metric system or International System of Units (SI) is used herein (e.g. metres for distance), but the system (10) may be applied in regions of the world with other measurement systems, for example systems that utilise inches, feet and/or yards.

Referring again to FIGS. 4 and 5, any of the range handicap (or skill level) and the range handicap categories (or skill level categories) may be displayed on the display (80) of the user device (72.1). Alternatively, or in addition, the terminal device (19) (shown in FIG. 1A) may be provided at the range area (12), or for example the terminal device (19) may utilise a projected image on the wall of an indoor range area. This display may indicate range handicaps and/or shot data of golfers or other competition data when the golfers compete against one another. For example, after each shot the grade may be displayed. If it is an indoor range area with a virtual range area (12) projected onto the wall, the shot data may appear on the wall together with other shot data such as data relating to the trajectory or flight path of the ball. The grade and/or shot data may form part of metadata that may be displayed along with a three-dimensional simulated hole. If a grade for a particular shot was good, the displayed grade may be highlighted or appear to rise from the ground in the virtually projected image of the simulated hole. The shot data or grade may also be compared to shot data or grades of professional golfers or other golfers such as celebrities or friends of the golfer (18.1), and a message may be displayed such as: "this shot was xx amount or xx percentage better than a professional golfer's" (where xx represents the amount or percentage). A message may also be displayed when the golfer improves one of the handicap categories for example by reaching a next integer (e.g. improved from 11.1 to 10.9). A post-session report may be generated and displayed. The post-session report may include data or metadata such as data relating to a most costly missed shot or best shot of the session. If a golfer has completed enough golf shots to have a valid category handicap, the post-session report may indicate that the range handicap category has been updated or generated. The post-session report may include placeholders for other category handicaps and/or for the overall range handicap, to incentivise the golfer to return to the range area (12). Statistics about previous sessions may also be displayed to the golfer (18.1) so that long term progress in each shot category may be tracked. The statistics for each shot category may be displayed in tables, charts or graphs as required, for example with an emphasis on the best and worst categories or shots, so that the golfer is enabled to identify areas of his or her game that needs improvement, or that he or she is particularly good at.

The difference (44) on the outdoor range area (12) described herein may be a scalar distance or a vector distance having direction as well as magnitude. It should be appreciated that alternatively, the difference may include differences between geographical coordinates of the target and the end location, or the difference may be a virtual difference which is estimated using the shot data (e.g. for the indoor range area with the wall projection or display).

FIG. 12 shows a table (208) for a session completed by the golfer (18.1). In this example, the skill level (62) of the golfer may be referred to as a range handicap of the golfer. Let's assume the golfer's tee shot range handicap category is 12.2 before starting the session. The golfer (18.1) now hits 13 drives or tee shots during the session, and the grade is calculated for each shot, utilising the distance (44) and the graphs in FIGS. 9 to 11 (or other data) for each shot. After hitting 13 shots, the golfer has thus outperformed his or her tee shot range handicap category by +0.54 strokes. This is the averaged grades of all the tee shots during the session, or stated differently, +0.54 is an example of the aggregate of the session's grades. This number may then be used to calculate a session score/differential for this category. A number of historical session differentials (for tee shots) may then be used to update the tee shot handicap category. The differential for the session may then be calculated by subtracting this average of the grades from the tee shot handicap category of the golfer as follows:

Tee Shot Differential=12.2−(+0.54)=11.7

This is an example of how a differential may be calculated for a particular category, however the differential may also be calculated utilising a different method. This tee shot differential may then be used to calculate the tee shot range handicap category as explained above with reference to FIG. 8. For example, if the golfer (14.1) has 10 differentials available (he or she has completed 10 sessions at the range with his or her driver), according to the table (94) in FIG. 8, the best 3 differentials of the 10 may be used to calculate the golfer's tee shot range handicap category. One of the weighted calculations explained above may then be performed to update the golfer's overall range handicap or skill level (by, for example calculating Range_HC for the range handicap or skill level, as the case may be). Each handicap category may also be updated by the system. This provides for handicap updating that may be intuitive for golfers and that may incentivise them to return to the range (12) many times to improve their range handicap categories or skill level categories and overall range handicap or skill level. The system (10) may require the golfer to hit a minimum number of shots in the session, or the system (10) may allow the golfer (18.1) to hit any number of shots during the session. A session score or grade may be provided to the golfer after each session, which may create a sense of pressure and achievement, similar to an actual round of golf. It should be appreciated that a golfer may use any selected club or clubs during the sessions and the system may be configured to automatically categorise the shots when the shot data is sensed on the range area (12). For the overall range handicap to be valid, the golfer may be required to have a valid handicap for each of the categories. A proposed minimum number of shots required for a valid session differential may be 10 shots, but other numbers may be selected. The grade of +0.54 is provided as an example and a convention utilised provides for a positive grade to cause an improvement of the relevant handicap category. Other conventions that utilise negative grades as improvements are also possible.

The range area (12) is in the example embodiment shown in FIG. 1 in the form of an outdoor area such as an outdoor driving range, however the invention extends to indoor areas such as an indoor driving range or other indoor golf facility (such as a golf simulator). The example targets in FIG. 1 are physical target posts (16.1, 16.2, 16.3), but it is envisaged that a virtual target may also be used, for example displayed on a screen or against a wall in the indoor area. The target zones (36.1, 36.2, 36.3, 38.1, 38.2, 38.3) may then be respective zones allocated on the screen or on the wall in the indoor area. The target zones may be scaled, shaped and/or sized according to the range handicap, skill level, or range handicap category(ies), or skill level category(ies) of the golfer or according to the type of golfer (as mentioned above). As shown in FIG. 1, the target zones may be sized relative to a distance between the target post and the start location. Each target zone may have a different shape. For example, the fairway zone may be an elongated shape, a rectangle-like shape, a square-like shape, or an annular shape whereas the green may have a circular, elliptical shape or a complex curved shape similar to the shape of regular greens on golf courses. The targets (16.1, 16.2, 16.3) may be provided in the middle of the green zone, but other arrangements are also possible where the target is not in the middle of the green zone. Other arrangements are also possible that do not utilise the different target zones (36.1, 36.2, 36.3, 38.1, 38.2, 38.3) (see FIG. 1A and its associated description above). Any shape (including arbitrary shapes) may be used for the fairway, green and rough zones as required by the particular application of the system 10.

The lie type of the golf ball (22) after the shot (20) may in the example embodiment be determined based on the shot data and the end location (28) of the golf shot. The lie type may be determined as a green lie when the end location of the golf shot is located inside one of the green zones (38.1, 38.2, 38.3). The lie type may be determined as a fairway lie when the end location of the golf shot is located inside one of the fairway zones (36.1, 36.2, 36.3). The lie type may be determined as a rough lie when the end location of the golf shot is located inside the rough zone i.e. anywhere on the range area (12) that is not inside the green or fairway zones and not at the start location (14.1). As per the graphs in FIGS. 9 to 11 (or other graphs and other data), the lie type may be taken into account when grading a shot. In some embodiments, there might not be a discrete lie type or zones allocated, but a rather a gradually deteriorating lie may be determined (i.e. strokes penalty) proportional to how far the shot ended up from its intended target.

Figure 13:
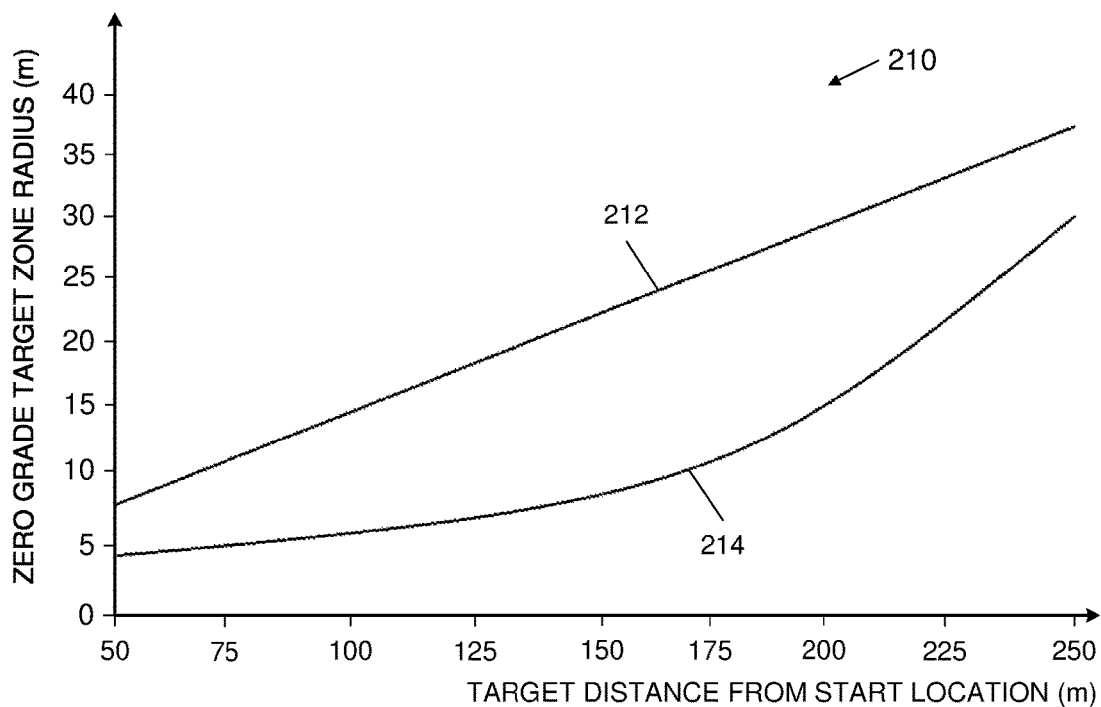
FIG. 13 is a graph illustrating an example of a radius of a zero grade target zone as a function of target distance.

Referring to FIG. 13, an example graph (210) is shown that illustrates a radius (43) of a zero grade target zone (37) (Shown in FIG. 1A) as a function of target distance from the start location (14.1). The zero grade target zone may have a radius corresponding to a zero grade (or a zero "strokes gained") distance. The line (212) illustrates a linear increase in target zone size (or radius) relative to target distance from the start location, whereas the curve (214) illustrates relative target sizes that may be used for professional golfers based on a consistent grade of shots. It should be understood that the graphs in FIGS. 9-11 and 13 are example graphs and the systems and methods disclosed herein are not limited to these example graphs (other graphs that are curved and/or irregular may also be used). These graphs may be drawn using curve fitting/interpolation/spline interpolations of data captured by the system (10). The data may also be dynamically adjusted over time, so that the graphs more accurately represent the golfer's current skill level and range handicap or range handicap categories, or skill level categories. It should also be appreciated that the surface (202) in FIG. 10 (and the lines in the other graphs in FIGS. 9, 11 and 13) need not be smooth and may have undulations, or other irregularities or may include a variety of polynomial (or other mathematical) shapes and forms. The zero grade target zone (37) radii may be adjusted according to the grades for a particular golfer. Hence, for shots that land inside the zero grade target zone (37), the golfer would obtain a positive grade and for shots that land outside the zero grade target zone (37), the golfer would obtain a negative grade. A method of calculating a size of such a zero grade target zone (37) (shown in dashed lines in FIG. 1A) having a radius (43) is for example:

1. Determine the distance between the target (17) and the starting location (14.1);
2. Use the graph (205) in FIG. 11 to calculate the amount of shots needed to complete the hole from a fairway lie for the distance determined in step 1 above; and
3. Use the short game data of the graph (98) in FIG. 9 to determine a distance to the hole that corresponds to a number of shots needed to complete the hole that is equal to one less than the number of shots needed to complete the hole determined in step 2 above.

The distance determined in step 3 would then be the selected distance for the radius (44) of the zero grade target zone (37), which may correspond to a zero grade if the ball ends up on an outer ring or perimeter of the zero grade target zone (37). It should be appreciated that the zero grade target zone (37) may be utilised instead of the fairway zones (36.1, 36.2, 36.3), the green zones (38.1, 38.2, 38.3) and the rough zone depicted in FIG. 1.

Various lengths of simulated holes may be implemented utilising the system (10). The length of a simulated par 4 may be different for each golfer (18.1 to 18.*n*) depending on their skill level or their respective range handicaps and range handicap categories or skill level categories or the type of golfer (as mentioned above). Alternatively, a length of the simulated hole may be selected according to what the average length of that hole type (par 3, par 4 or par 5) is for the particular region in the world where the range area (12) is located. For the approach shot categories (88.2, 88.3, 88.4), the lie type may be regarded as a fairway lie instead of a tee lie and a graph similar to the graph (205) in FIG. 11 may then be used to do the calculations for shots needed to complete the hole before and after the shot is hit. It should be understood that the lie type may be a hypothetical lie type or lie quality that may be estimated or determined by the system (10). It should be appreciated that some of the shots required to complete the hole represented in the graphs in FIGS. 9 to 11 may be putts and/or chip shots which are not performed on the range area but are estimated shots or strokes that the golfer would on average take to complete the simulated hole. The system (10) may allow the golfer (18.1) to come to the range (12) with any selected club or clubs and to hit as many golf shots as he or she desires. No set amount of shots need to be prescribed and using the systems and methods herein, the golfer's overall range handicap and range handicap categories may be calculated even if for example the golfer only hits a number of 7 iron shots or only a number of drives. The system (10) may however be configured to provide different challenges to golfers wherein a set number of shots in a category or club is prescribed. Each shot in the session is then scored and the golfer may be rewarded for completing the challenge. It should be appreciated that multiplayer games or challenges may be implemented using the system (10), enabling golfers of various range handicaps to compete against one another while being scored relative to their own respective overall range handicaps or range handicap categories (similar to a club-hosted golf competition).

It should be understood that reference is made above to a range handicap. It will be appreciated by those skilled in the art that the invention extends to a system and method of determining and managing an indication of the skill level of a golfer. The invention is therefore not limited to the traditional definition of a handicap, and other means of determining the skill level of the golfer may be used that is not related to a traditional handicap determination per se. The skill level of the golfer may hence be determined and managed by the system, enabling the golfer to track his or her own skill level over time and to compete against himself or herself or other golfers.

It should be understood that golf balls used at driving ranges differ significantly from what is referred to as premium balls used on regular golf courses. Characteristics of driving range balls include a shorter flight path to accommodate limited space on many driving range areas. The system may prompt (for example via the user device (72.1)) the golfer (18.1) prior to starting a session to determine whether range balls or premium balls are to be used. A conversion algorithm or formula may be used to convert the shot data between range balls and premium balls (sometimes referred to as normalisation). The graphs in FIGS. 9 to 11 may be graphs for premium balls or for range balls, as the circumstances require. If the system (10) utilises data for premium balls and the gathered or captured shot data is for range balls, the conversion algorithm may be applied to convert the distances to that of premium balls, so that the grade generated may more accurately reflect the golfer's performance. In some instances, the golfer may hit premium balls on the range area (12), in which case the system may gather this information from the golfer for example via the application on the user device (72.1) and the conversion algorithm would not be necessary. The conversion algorithm may be configured by utilising empirical test data of golf shots hit with both premium and range balls, or data from golf ball manufacturers or data from launch monitor manufacturers.

It should further be appreciated that a graph similar to FIG. 9 may be generated which is only a function of distance from the hole, and that is not limited to specific zones such as the green zone, fairway zone and rough zone shown in FIG. 9.

Figure 14:
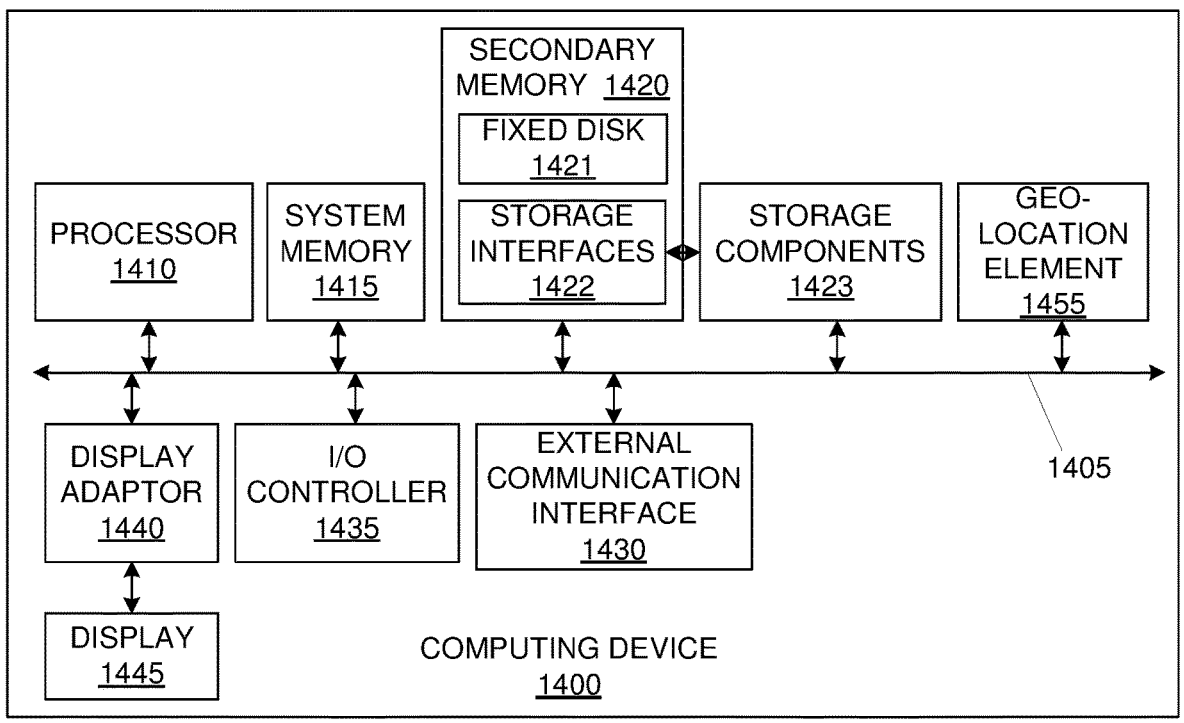
FIG. 14 illustrates an example of a computing device in which various aspects of the disclosure may be implemented.

FIG. 14 illustrates an example of a computing device (1400) in which various aspects of the disclosure may be implemented. The computing device (1400) may include a processor (1410) for executing the functions of components described herein, which may be provided by hardware or by software units executing on the computing device (1400). The software units may be stored in a memory component (1415) and instructions may be provided to the processor (1410) to carry out the functionality of the described components. In some cases, for example in a cloud computing implementation (such as, but not limited to cloud computing services provided by Amazon™ Web Services Inc. (AWS) or by Microsoft™ Azure), software units arranged to manage and/or process data on behalf of the computing device (1400) may be provided remotely. Some or all of the components may be provided by a software application downloadable onto and executable on the computing device (1400). The computing device (1400) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (1400) may be suitable for storing and executing computer program code. The various participants and elements in the previously described system diagrams may use any suitable number of subsystems or components of the computing device (1400) to facilitate the functions described herein. The computing device (1400) may include subsystems or components interconnected via a communication infrastructure (1405) (for example, a communications bus, a network, etc.). The computing device (1400) may include one or more processors (1410) and at least one memory component in the form of computer-readable media. The one or more processors (1410) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (1400) may be distributed over a number of physical locations (e.g. in a distributed, cluster or cloud-based computing configuration) and appropriate software units may be arranged to manage and/or process data on behalf of remote devices.

The memory components may include system memory (1415), which may include read only memory (ROM) and random access memory (RAM). A basic input/output system (BIOS) may be stored in ROM. System software may be stored in the system memory (1415) including operating system software. The memory components may also include secondary memory (1420). The secondary memory (1420) may include a fixed disk (1421), such as a hard disk drive, and, optionally, one or more storage interfaces (1422) for interfacing with storage components (1423), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (1400) may include an external communications interface (1430) for operation of the computing device (1400) in a networked environment enabling transfer of data between multiple computing devices (1400) and/or the Internet. Data transferred via the external communications interface (1430) may be in the form of signals, which may be electronic, electromagnetic, optical, radio, or other types of signal. The external communications interface (1430) may enable communication of data between the computing device (1400) and other computing devices including servers and external storage facilities. Web services may be accessible by and/or from the computing device (1400) via the communications interface (1430).

The external communications interface (1430) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (1430) may include a subscriber identity module (SIM) in the form of an integrated circuit that stores an international mobile subscriber identity and the related key used to identify and authenticate a subscriber using the computing device (1400). One or more subscriber identity modules may be removable from or embedded in the computing device (1400).

The computer-readable media in the form of the various memory components may provide storage of computer-executable instructions, data structures, program modules, software units and other data. A computer program product may be provided by a computer-readable medium having stored computer-readable program code executable by the central processor (1410). A computer program product may be provided by a non-transient computer-readable medium, or may be provided via a signal or other transient means via the communications interface (1430).

Interconnection via the communication infrastructure (1405) allows the one or more processors (1410) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (1400) either directly or via an I/O controller (1435). One or more displays (1445) (which may be touch-sensitive displays) may be coupled to or integrally formed with the computing device (1400) via a display (1445) or video adapter (1440).

The computing device (1400) may include a geographical location element (1455) which is arranged to determine the geographical location of the computing device (1400). The geographical location element (1455) may for example be implemented by way of a global positioning system (GPS), or similar, receiver module. In some implementations the geographical location element (1455) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (1400). In some implementations, the geographical location element (1455) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations, or may be performed by different computing devices than shown in the diagrams and/or illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A skill level determination and management system, the system including a memory for storing computer-readable program code and a processor for executing the computer-readable program code, the system including:
    one or more sensors for sensing shot data of a golf shot hit by a golfer towards a target, wherein the shot data includes sensed trajectory data of a golf ball hit by the golfer;
    a backend including a database component in which is stored a skill level associated with a unique identifier (UID) of the golfer;
    a transmitting component configured to transmit the shot data to the backend, wherein one of the backend, a local computing device, or sensor(s) is configured to derive or estimate an end location associated with the golf shot from the shot data;
    a comparing component for comparing the end location associated with the golf shot to a target location and grading the shot, taking into consideration at least a difference between the end location and the target location and the stored skill level associated with the UID of the golfer; and
    a skill level management component for updating, repeatedly or in near real-time, the stored skill level associated with the UID of the golfer, based on the grade, if it is determined that the shot data for the golf shot is valid.

2. The system as claimed in claim 1, wherein the shot data is utilised to assign the golf shot into one of at least two categories.

3. The system as claimed in claim 2, wherein the at least two categories represent different types of golf shots.

4. The system as claimed in claim 2, wherein the skill level is divisible into at least two skill level categories corresponding to the at least two golf shot categories.

5. The system as claimed in claim 4, wherein the skill level management component is configured to determine the skill level based on a weighted calculation of the at least two skill level categories.

6. The system as claimed in claim 5, wherein a weight allocated to each skill level category is calculated based on an average number of shots in the corresponding shot category that a golfer of similar skill to the golfer usually hits during a round of golf.

7. The system as claimed in claim 1, wherein the skill level is calculated using the formula:

$$\text{Range\_HC} = x \cdot \text{ShotCategory1\_HC} + y \cdot \text{ShotCategory2\_HC} + \ldots + z \cdot \text{ShotCategoryN\_HC}$$

wherein:
    Range_HC is the skill level of the golfer;
    ShotCategory1_HC is a first shot category skill level of the golfer;
    ShotCategory2_HC is a second shot category skill level of the golfer;
    ShotCategoryN_HC is an $N^{th}$ shot category skill level of the golfer; and
    x, y, and z are respective weights allocated to ShotCategory1_HC, ShotCategory2_HC, and ShotCategoryN_HC of the golfer.

8. The system as claimed in claim 1, wherein the system is configured to automatically sense a plurality of shots, and wherein the skill level is updated based on the grade of each of the plurality of golf shots.

9. The system as claimed in claim 1, wherein the system is configured to sense a plurality of shots that are grouped into a session, and wherein the comparing component utilises only valid shot data from the plurality of sensed shots in the session to grade each of the shots.

10. The system as claimed in claim 9, wherein the skill level is updated after the session using a differential which is calculated as a difference between the skill level and an average grade for all the valid shots for the session relative to the golfer's current skill level.

11. The system as claimed in claim 1, wherein the target is a physical target and wherein the golf shot is hit on an outdoor range area.

12. The system as claimed in claim 1, wherein the target is a virtual target.

13. The system as claimed claim 1, wherein a hypothetical lie type of the ball is estimated based on the shot data, and wherein the lie type is taken into consideration when grading the golf shot.

14. The system as claimed claim 1, wherein the system includes a user device associated with the golfer, the user device having an application executable thereon to facilitate operation of the system.

15. The system as claimed claim 1, wherein the system is arranged to manage a plurality of skill levels for a plurality of golfers, and wherein the system enables the plurality of golfers to compete against one another.

16. A computer-implemented method for managing a skill level, the method comprising:
    sensing shot data by one or more sensors for sensing shot data of a golf shot hit by a golfer towards a target, wherein the shot data includes sensed trajectory data of a golf ball hit by the golfer;

by a transmitting component, transmitting the shot data to a backend;

by the backend including a database component, storing a skill level associated with a unique identifier (UID) of the golfer in the database component, and by one of the backend, a local computing device, or sensor(s), deriving or estimating an end location associated with the golf shot by way of the shot data;

by a comparing component, comparing the end location associated with the golf shot to a target location and grading the shot taking into consideration at least a difference between the target location and the end location and the stored skill level associated with the UID of the golfer; and updating, repeatedly or in near real-time, the stored skill level associated with the UID of the golfer, based on the grade, if it is determined that the shot data for the golf shot is valid.

17. A computer program product for managing a skill level, the computer program product comprising a computer-readable medium having stored computer-readable program code for performing the steps of:

sensing shot data by one or more sensors for sensing shot data of a golf shot hit by a golfer towards a target, wherein the shot data includes sensed trajectory data of a golf ball hit by the golfer;

by a transmitting component, transmitting the shot data to a backend;

by the backend including a database component, storing a skill level associated with a unique identifier (UID) of the golfer in the database component, and by one of the backend, local computing device or sensor(s) deriving or estimating an end location associated with the golf shot by way of the shot data;

by a comparing component, comparing the end location associated with the golf shot to a target location and grading the shot taking into consideration at least a difference between the target location and the end location and the stored skill level associated with the golfer; and updating repeatedly or in near real-time the stored skill level associated with the UID of the golfer, based on the grade, if it is determined that the shot data for the golf shot is valid.

* * * * *